United States Patent [19]

Bogner et al.

[11] Patent Number: 4,568,095

[45] Date of Patent: Feb. 4, 1986

[54] ALL TERRAIN VEHICLE CONTROL SYSTEM

[75] Inventors: Philip D. Bogner, Milnor; Charles Krause, Hankinson; John W. Henline, Lisbon, all of N. Dak.

[73] Assignee: Clark Equipment Company, Buchanan, Mich.

[21] Appl. No.: 628,090

[22] Filed: Jul. 5, 1984

[51] Int. Cl.$^4$ .............................................. B60G 25/00
[52] U.S. Cl. ..................................... 280/6 H; 180/41
[58] Field of Search .............. 280/6 H, 6 R, 104, 709; 414/630, 631, 632, 639; 180/41

[56] References Cited

U.S. PATENT DOCUMENTS

| | | | |
|---|---|---|---|
| 3,899,037 | 8/1975 | Yuker | 180/6.48 |
| 4,018,296 | 4/1977 | Knudson | 280/6 H |
| 4,279,319 | 7/1981 | Joyce | 280/6 H |
| 4,340,235 | 7/1982 | Thompson | 280/6 H |

FOREIGN PATENT DOCUMENTS 7700902  5/1978  Sweden .

Primary Examiner—Richard A. Bertsch
Attorney, Agent, or Firm—Kenneth C. Witt; John C. Wiessler

[57] ABSTRACT

A system for controlling two wheels at one end of a skid steer vehicle. The wheels are mounted at the distal ends of a pair of downwardly extending pivot arms; the pivot arms are mounted on the vehicle body about a common transverse axis. Two hydraulic cylinders can be operated simultaneously in either direction to raise or lower the ends of both the pivot arms thereby lowering or raising one end of the vehicle. The two hydraulic cylinders under another operating condition for the vehicle are interconnected through a hydraulic loop circuit which permits the wheel on one side of the vehicle to move upwardly and the wheel on the other side move downwardly the same amount to automatically change the attitude of the vehicle to a more nearly level position.

3 Claims, 2 Drawing Figures

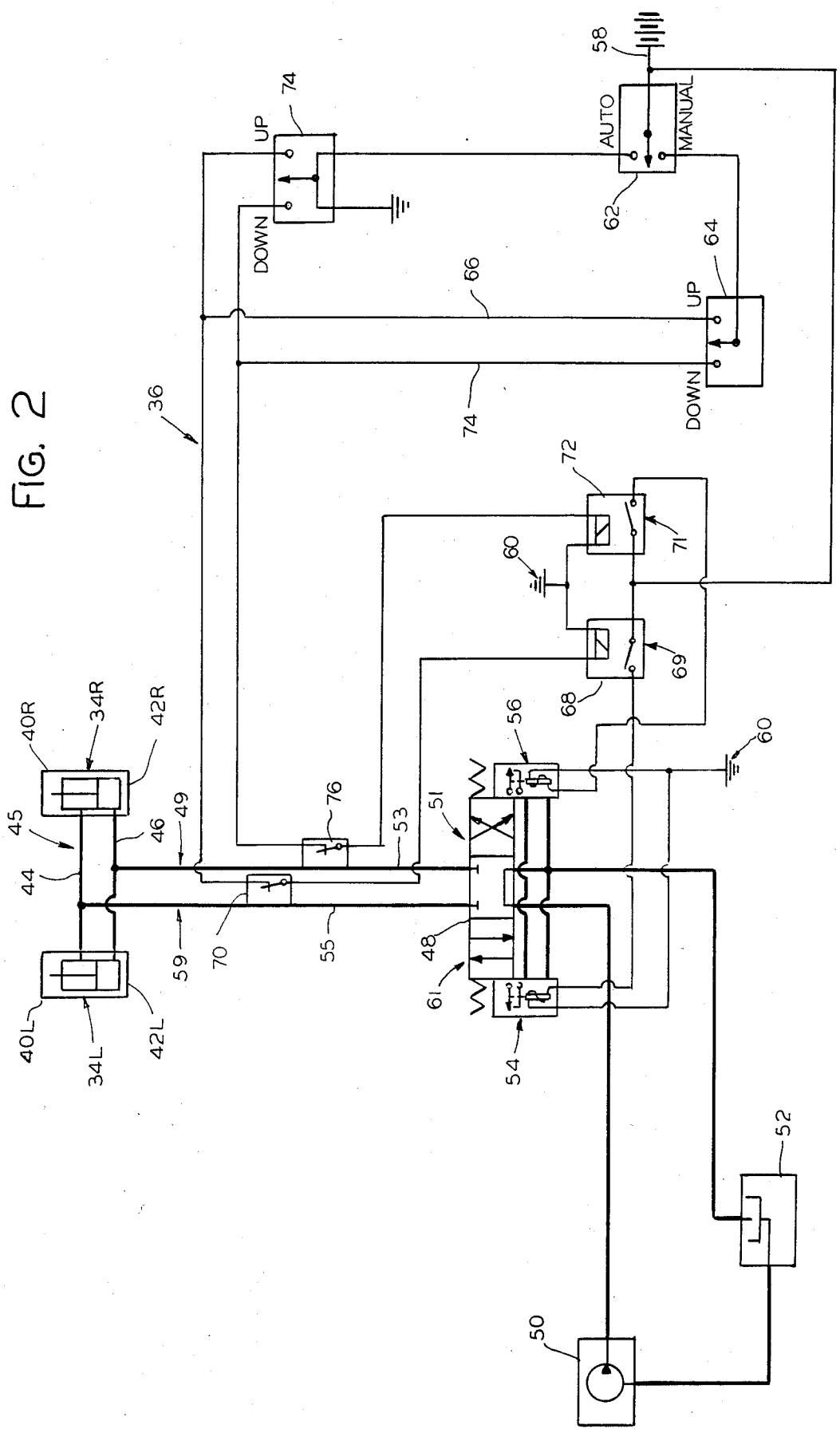

4,568,095

ALL TERRAIN VEHICLE CONTROL SYSTEM

BACKGROUND OF THE INVENTION

1. Field of the Invention

This invention relates to a system for controlling parts of an all terrain vehicle to maintain the vehicle at a desired attitude relative to the ground when the ground surface is uneven.

2. Description of the Prior Art

U.S. Pat. No. 3,899,037 Yuker shows a four wheel vehicle in which each of the four wheels can be moved up and down and also in and out. To operate the wheels a separate manually operated valve is provided for each function of each wheel. The Yuker patent shows a pendulum device for simultaneously operating two valves on opposite sides of the vehicle to raise one wheel and lower the other.

Swedish Pat. No. 7700902-5 shows a six wheel all terrain vehicle which is similar to the all terrain vehicle shown and described herein, and the present invention could be used on a vehicle such as that disclosed in the Swedish patent. The vehicle of the Swedish patent is the skid steer type whereas the vehicle shown in the Yuker patent is not the skid steer type.

SUMMARY OF THE INVENTION

This invention is for a skid steer vehicle which has two wheels adjacent one end of the vehicle mounted respectively on two pivot arms which have a common transverse axis. The two arms are operated respectively by two hydraulic cylinders, each of which has a head end and a rod end. A first hydraulic conduit joins the head ends of the hydraulic cylinders, and a second hydraulic conduit joins the rod ends of the hydraulic cylinders. A three-position valve is interposed in hydraulic connections to the hydraulic cylinders and such valve has a first position for energizing a first hydraulic circuit, a second position for energizing a second hydraulic circuit, and a third neutral position. A first solenoid associated with the valve acts to move it to the first position for moving both the hydraulic cylinders simultaneously in one direction, and a second solenoid associated with the valve acts to move it to the second position for moving both the hydraulic cylinders in the other direction. The first and second hydraulic conduits form with the cylinders a closed loop circuit whereby when the valve is in the neutral position and one cylinder moves in one direction the other cylinder moves the same amount in the other direction.

BRIEF DESCRIPTION OF THE DRAWING

FIG. 2 is a schematic diagram of the electrical and the hydraulic components and circuits for the vehicle of FIG. 1.

DESCRIPTION OF THE PREFERRED EMBODIMENT

Figure 1:
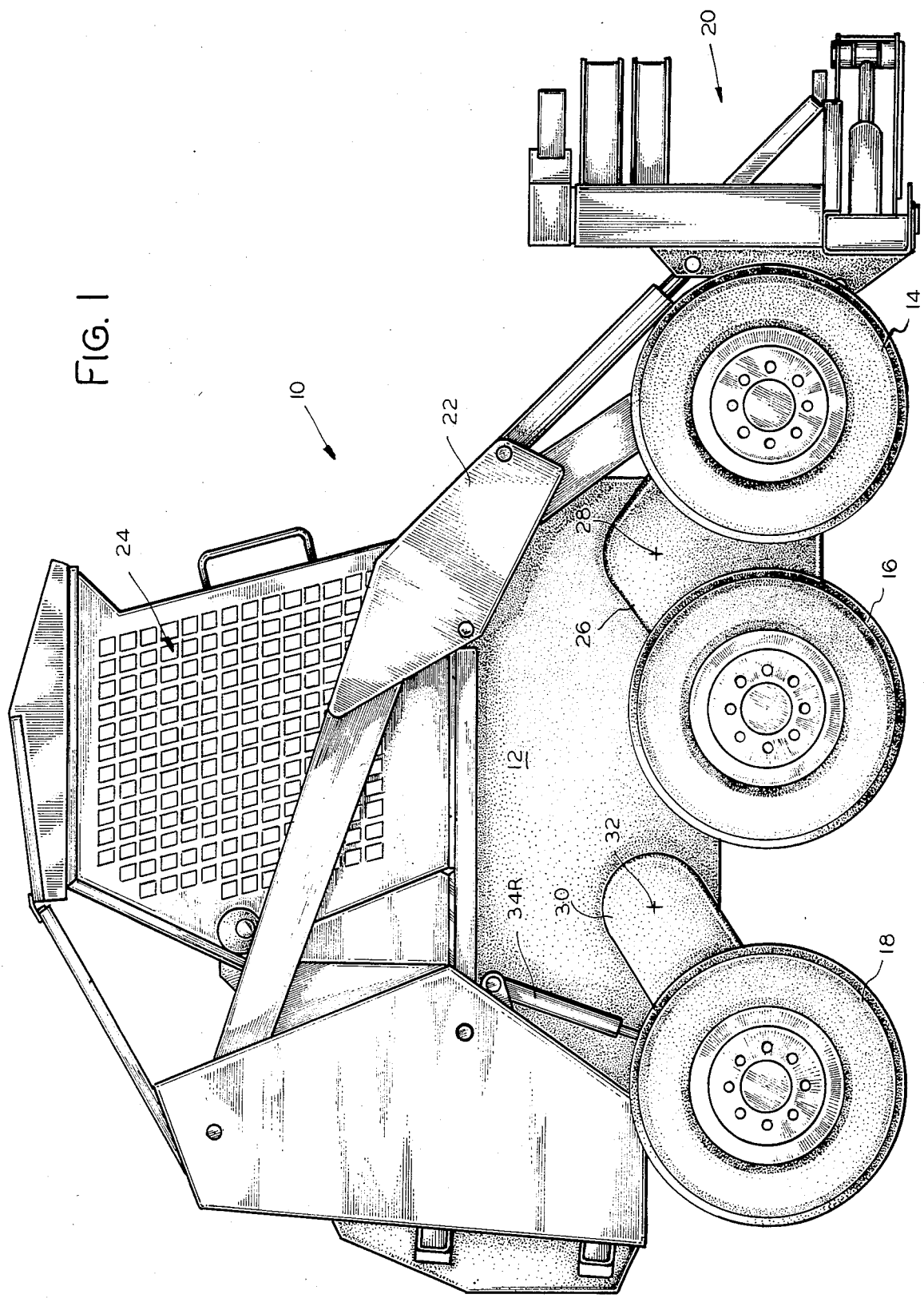
FIG. 1 is a side elevational view of a six-wheel vehicle embodying this invention.

In FIG. 1 there is shown an all terrain, skid steer vehicle indicated generally by the numeral 10. This vehicle includes the body portion 12 which is supported by six wheels, three of which are shown at 14, 16 and 18. As shown vehicle 10 is a vehicle which carries an implement, namely a tree shearing head 20 at the forward end of a boom arm mechanism 22. The vehicle includes an operator's station indicated generally at 24.

The front two wheels 14 and 16 on the near side are mounted on a bogie 26 which is pivoted about transverse axis 28. The two front wheels on the other side are mounted on a similar bogie which is a mirror image of 26 and also pivots about axis 28. This permits the two front wheels on each side to pivot about the pivot axis of their bogie, independently of the wheels on the other side, thus to assist in providing all terrain capability for the vehicle 10. The rear wheel 18 which is shown on the drawing is mounted on the pivot arm 30 which is pivoted about an axis 32 by hydraulic cylinder 34 to raise and lower the wheel 18 at the election of the operator. The other rear wheel on the other side of the vehicle is the same as the one shown except it is reversed. The operator can raise or lower both of the two pivot arms and two rear wheels simultaneously, by manual operation of the control valve 48 (see FIG. 2), but when such control valve is in neutral the rear wheels can move independently to assist in adapting the vehicle to uneven terrain, the pivot arm and wheel on one side moving upwardly the same amount as the pivot arm and wheel on the opposite side move downwardly.

FIG. 2 of the drawing shows a schematic diagram which portrays the present invention, including both the electrical and hydraulic components and the circuits for both. The control system of this invention is indicated in FIG. 2 generally by the numeral 36. A pair of hydraulic cylinders 34L and 34R are connected respectively between the vehicle body 12 and respective pivot arms 30 (only 34R is shown). The hydraulic cylinders are double acting and include rod ends indicated generally at 40L and 40R and head ends indicated at 42L and 42R. A hydraulic conduit 44 interconnects the rod ends of the two cylinders and another hydraulic conduit 46 interconnects the head ends of the cylinders. The cylinders 34L and 34R may be operated by a three-position valve 48 which has a neutral position and two operating positions one of which causes the hydraulic cylinders to extend simultaneously and the other of which causes said cylinders to retract simultaneously. When the valve 48 is in the neutral position shown on the drawing the hydraulic cylinders are not operative to be extended in unison or retracted in unison, however, because of the hydraulic loop formed by the two hydraulic cylinders and the interconnecting conduits 44 and 46, rough terrain which tends to change the attitude of the vehicle causes one of the hydraulic cylinders to extend and the other to contract an equal amount to adjust the attitude of the vehicle so that it is level or more nearly level relative to the terrain on which the vehicle is operating.

Included in the hydraulic portion of the control system 36 is a pump 50 which supplies valve 48 and cylinders 34L and 34R by means of a conventional open-center circuit, with the discharge from the valve or a cylinder returning to the reservoir 52.

There are two solenoid operators for valve 48 indicated at 54 and 56 respectively which when actuated operate the hydraulic cylinders 34L and 34R in the extend direction or the retract direction respectively. The solenoids 54 and 56 are operated by means of an electrical circuit which extends from a source of electricity such as battery 58 to ground at 60. The switch 62 in the electrical circuit has a lower position indicated in FIG. 2 and when switch 62 is closed in this position switch 64 is energized. Then, manually operated switch 64, shown in neutral, may be moved to either the up position or the down position. Conductor 66 is for the up position and when energized supplies a solenoid 68 through a pressure limit switch 70. Similarly solenoid switch 72 is supplied through a conductor 74 and a pressure limit switch 76. When manually operated switch 64 is moved from the neutral position shown to either of the operating positions the corresponding solenoid switch 69 or 71 is operated to energize solenoid 54 or 56 respectively. The operation of solenoid 54 causes the valve 48 to move to one operating position in which the hydraulic cylinders are extended in unison, while operation of the other solenoid 56 causes the hydraulic cylinders to be operated in unison in the other direction. The switches 70 and 76 are pressure sensitive and operate when a selected upper limit pressure occurs in the respective hydraulic passages to automatically open the circuit to the solenoid 68 or 72, as the case may be, and thus return valve 48 from either operating position to neutral. This causes the source of hydraulic pressure to be disconnected from the cylinders when they have reached the extreme travel position in either direction.

In addition to the manual operating position indicated for switch 62 on the drawing there is a second automatic position which connects the solenoid switches 54 and 56 through the respective circuits previously described except that switch 74 is interposed in the circuit or circuits in place of switch 64. Switch 74 is arranged to respond to a pendulum device which senses the attitude of the vehicle, closing one switch or the other in the device 74 when the vehicle body has reached a position which indicates a predetermined amount of tilt by the vehicle body.

While we have illustrated and described the best mode contemplated for carrying out our invention it will be appreciated that modifications may be made. Accordingly, it should be understood that we intend to cover by the following claims all such modifications which fall within the true spirit and scope of the invention. It should be understood also that where specific terms such as "solenoid" have been employed in the claims they are intended to cover other equivalent means in the claimed system. "Cylinder" as used herein means a double acting linear hydraulic motor comprising an outer barrel portion with both ends closed and an internal piston forming variable volume chambers between the piston and the respective ends of the barrel portion. The piston is mounted on a rod which projects through the closure at one end of the barrel portion.

We claim:

1. An electrohydraulic control system for an all terrain vehicle having two wheels adjacent one end of the vehicle mounted respectively on two pivot arms which have a common transverse axis and are operable respectively by two hydraulic cylinders, each of which has a head end and a rod end, comprising
   a first hydraulic conduit joining the head ends of said hydraulic cylinders,
   a second hydraulic conduit joining the rod ends of said hydraulic cylinders,
   connections to a source of hydraulic pressure for said hydraulic cylinders,
   a three-position valve interposed in said connections having a first position for energizing said first hydraulic circuit and a second position for energizing said second hydraulic circuit and a third neutral position,
   electrical means acting on said three-position valve for selectively energizing said first hydraulic circuit for moving both said cylinders simultaneously in one direction,
   said electrical means acting on said three-position valve for selectively energizing said second hydraulic circuit for moving both said cylinders in the other direction,
   said first and second hydraulic conduits forming with said cylinders a loop circuit whereby when said three-position valve is in neutral and one cylinder moves in one direction the other cylinder moves in the other direction,
   said first and second hydraulic conduits being selectively energizable automatically in response to a device which is responsive to the attitude of said vehicle,
   said first and second hydraulic conduits being selectively energizable manually, and
   two sensors responsive to the pressures in said two hydraulic conduits respectively connected to halt either raising or lowering operation of the two hydraulic cylinders when the hydraulic pressure therein reaches a predetermined amount.

2. A control system as in claim 1 wherein said device includes a pendulum type mechanism which is responsive to tilting movement of the vehicle about a longitudinal axis.

3. A control system as in claim 1 wherein there is an electrical circuit which includes two switches operated respectively by said sensors.

* * * * *